United States Patent [19]

Peters et al.

[11] 4,207,384

[45] Jun. 10, 1980

[54] ELECTRIC STORAGE BATTERIES

[75] Inventors: Kenneth Peters, Walkden; Barry Culpin, Bolton, both of England

[73] Assignee: Chloride Group Limited, London, England

[21] Appl. No.: 41,809

[22] Filed: May 23, 1979

[30] Foreign Application Priority Data

May 24, 1978 [GB] United Kingdom ............... 21868/78
May 24, 1978 [GB] United Kingdom ............... 53499/77
Dec. 14, 1978 [GB] United Kingdom ............... 48486/78

[51] Int. Cl.² ............................................. H01M 2/12
[52] U.S. Cl. ..................................... 429/54; 429/157; 429/178; 429/225
[58] Field of Search ........... 429/178, 54, 157, 225–228

[56] References Cited

U.S. PATENT DOCUMENTS

| | | | |
|---|---|---|---|
| 3,177,096 | 4/1965 | Jache | 429/54 X |
| 3,230,112 | 1/1966 | Watanabe et al. | 429/178 X |
| 3,775,182 | 11/1973 | Patton et al. | 429/178 X |
| 4,053,687 | 10/1977 | Coibion | 429/178 X |

*Primary Examiner*—Charles F. Lefevour
*Attorney, Agent, or Firm*—Oblon, Fisher, Spivak, McClelland & Maier

[57] ABSTRACT

There is disclosed a sealed lead acid button cell having a moulded acid resistant polymer case formed in two portions each portion having a central boss with a passage leading into the cell, and a metal plug located in the said passage, the inner end of the plug being electrically connected to the electrode located in that portion of the case, and a cap made of a metal harder than the metal of the said plug surrounding the central boss and squeezing it against the plug and the cap being electrically connected to the plug. The cap may thus be crimped around the boss or may be a force fit thereon. The case is provided with a pressure relief vent to allow gases to vent under service conditions.

17 Claims, 3 Drawing Figures

ELECTRIC STORAGE BATTERIES

The present invention relates to electric storage cell of the type known as button cells. Such cells are relatively flat and have a thickness less than their breadth or width and have terminals on their opposed faces so that a pack of cells can be made up by placing the cells end to end positive terminal to negative terminals.

According to the present invention a sealed lead acid button cell has a moulded acid resistant polymer case formed in two portions each portion having a central boss with a passage leading into the cell, and a metal plug located in the said passage, the inner end of the plug being electricallly connected to the electrode located in that portion of the case, and a metal cap surrounding the central boss and squeezing it against the plug and being electrically connected to the plug. The cap may thus be crimped around the boss or may be a force fit thereon.

The electrode may be spot welded to the inside end of the plug which is preferably lead or lead alloy e.g. the same as the electrode.

The cap which may be of brass need only make physical contact with the top end of the plug which preferably has a head which extends over the end of the boss but preferably not so far as the edge of the boss.

The case preferably has the boss located in a recess so that the cap, when fitted is just proud of the outside surface of the case. The two portions of the case are preferably two closely similar halves. Each half preferably has a venting arrangement separate from the sealing arrangement.

The venting arrangement preferably consists of a boss, recessed below the surface of the case, having a hole leading to the interior of the case. The boss is preferably located in a slot adapted to hold a spring biased against the hole in the boss and carrying a sealing pad e.g. of rubber and adapted to unseal the hole only when the pressure rises inside the cell. The spring is preferably also recessed beneath the surface of the case. In its broadest aspect the invention extends to this venting aspect independently of the other aspect of the cell mentioned herein.

The casing is preferably provided with recesses, at each corner of each terminal face, adapted to engage clips so as to enable the cells to be clipped together to form continuous cell packs of any desired size. In its broadest aspect the invention extends to this securing aspect independently of the other aspects of the cell mentioned herein.

The terminal faces may also be provided with register means e.g. cooperating pins and sockets to assist in assembling such packs and these register means are preferably also such as to ensure that the cells can only be assembled in the correct polarity relationships. In its broadest aspect the invention extends to this registry aspect independently of the other aspects of the cell mentioned herein.

The electrodes may have expanded metal supports for the active material.

The electrodes of opposite polarity are preferably separated from each other by a dense sheet of acid resistant fibres e.g. glass fibres especially short staple glass fibres, of micron or sub-micron diameter e.g. less than 2 microns diameter. Each electrode is preferably separated from the inside of the terminal face of the cell by a ring of the same or similar material.

The cell perferably has at least as much negative active material capacity as positive active material capacity so that on charge gas recombination can occur at the negative electrode. The cell also contains a reduced amount of electrolyte compared with a flooded cell, the electrolyte quantity and active material and separator porosity, liquid retention and pore size being such as to ensure that adequate gas transport through the cell can occur to enable gas recombination to occur and thus prevent significant gas venting and electrolyte loss during normal use of the cell. The cell is thus referred to as a sealed cell even though venting means are provided to deal with excessive gas generation such as may occur on overcharge. The cell is provided with its electrolyte requirements during manufacture and does not require addition of electrolyte during use.

The electrode supports are preferably made from lead or lead alloys which minimize the evolution of hydrogen.

The invention may be put into practice in various ways and one specific embodiment will be described by way of exampie with reference to the accompanying drawings, in which.

Figure 2:
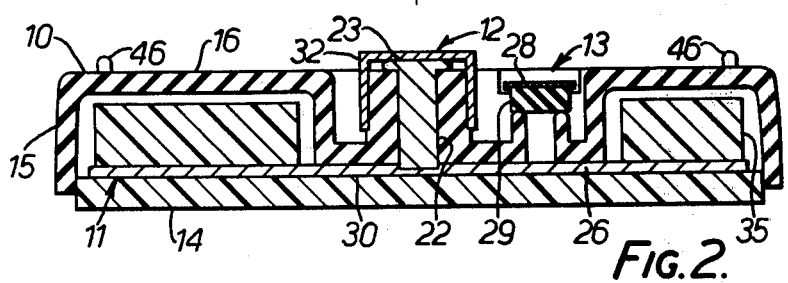
FIG. 2 is a cross section of half of the assembled cell on the line II—II of FIG. 1.

A rechargeable cell in accordance with the invention is made from two halves each comprising a housing 10, a pasted electrode 11, a terminal 12 and a vent 13 as indicated in FIG. 2.

The two electrodes are spaced apart and insulated from each other by a separator 14, half the thickness of which lies in one half of the cell and half in the other half.

Figure 1:
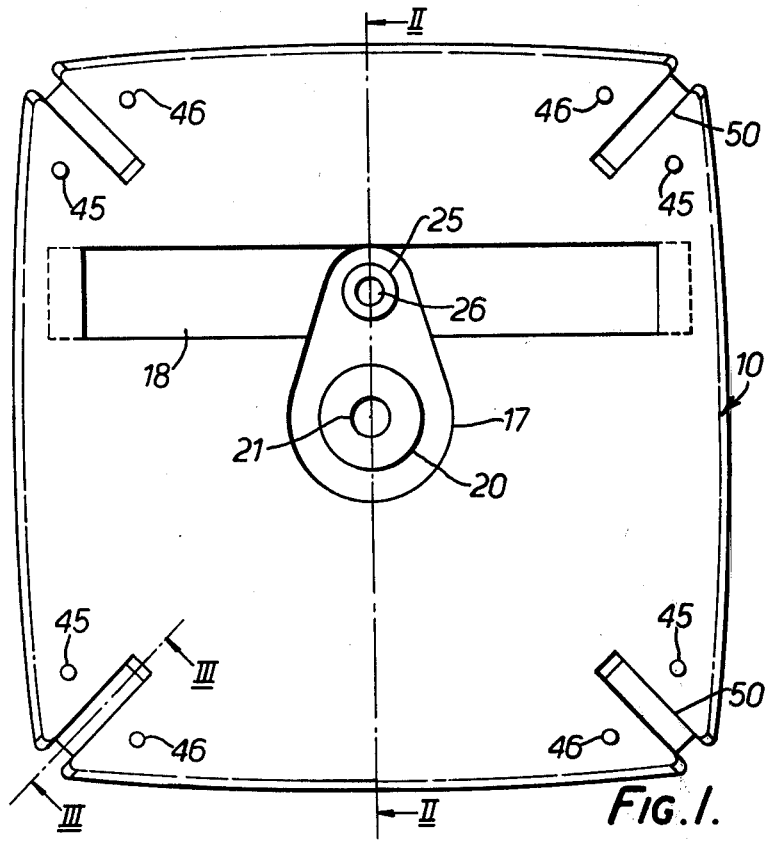
FIG. 1 is a plan view of the housing of a cell in accordance with the invention, on an enlarged scale.
Figure 3:
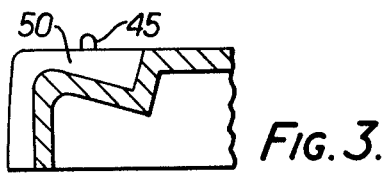
FIG. 3 is a cross section of one corner of the cell housing on the line III—III of FIG. 1.

Referring now to FIGS. 1, 2 and 3 each housing is made from injection moulded polystyrene or preferably acrylonitrile-butadiene-styrene polymer. It is of generally square plan but with rounded edges, a skirt 15 depending from the terminal face 16. Each terminal face 16 has a terminal recess 17 at its centre and one of the terminal faces 16 has an elongate vent recess 18 extending across its surface and communicating with one side of the terminal recess. The terminal recess has at its centre a cylindrical terminal boss 20 with a central passage 21 passing through it into the interior of the housing.

This passage contains a plug 22 made of lead having a head 23 located outside the cell against the end of the boss 20.

The terminal recess also communicates with the vent recess 18 and there contains a small rounded top vent boss 25 having a central vent hole 26 which extends into the interior of the cell. The ends of the vent recess 18 are undercut so as to enable a strip of spring material 28 to be held in the recess 18. The strip 28 carries a rubber pad 29 attached to its underside and located so as to normally seal the hole 26.

The electrode 11 is an expanded mesh grid pasted with lead oxide active material. The grid is welded to the end of the plug 22. A brass cap 32 is then forced over the boss 20 and squeezes the head 23 of the plug and squeezes the walls of the boss 20 inwardly forming a tight force fit, and a good seal with the plug 22 as well as good electrical contact with the head of the plug. It will be appreciated that the material of the cap is stronger than that of the plug so that any deformation caused by the force fit occurs substantially in the plug and not in the cap.

If desired the seal may be enhanced by placing sealing compound, e.g. epoxy resin, or hot melt adhesive between the plug 22 and the inside wall of the boss 20. Since it is held under compression in this location hot melt adhesive provides a good seal with the lead plug 22.

The underside of the wall 16 is spaced from the electrode 11 by a disc of separator material 35.

The separator 14 and the separator 35 need not be identical since the main function of the separator 35 is to retain electrolyte whilst the separator 14 must also resist treeing through from one electrode to the other whilst also allowing ion transport to achieve current generation during discharge of the cell and gas transport to allow gas recombination during charging of the cell.

It has been found that a dense sheet of blotting paper like appearance made from micron or submicron diameter staple glass fibres is a very satisfactory material for use as the separators. Fibre diameters of below 10 microns are best with fibre diameters of 0.5 to 2 microns being especially good.

The grid is preferably made from a lead alloy containing 0.07% calcium and 0.7% tin or a lead alloy comprising 0.075% to 0.13% calcium e.g. 0.075 to 0.10% calcium, 0.005 to 0.99% by weight tin e.g. 0.4 to 0.7% tin and desirably aluminium in an amount of 0.001% to 0.1% by weight.

The grid is preferably made from a sheet 0.5 mms thick, and has diamond shaped apertures 7.5 mms long and 2.0 mms wide and strands 0.5 mms wide. This has been found satisfactory for a grid 35 mms in diameter. After expansion the expanded grid is 1.0 mms thick.

The grid can alternatively be square to fit the housing shown in FIG. 1.

A cell having 0.2 Ahr capacity can be made up as follows. The housing is 35 mms wide and 10 mms deep. A separator disc 35 (1.5 mms thick) is laid into each cell half. An electrode support is located in each cell half and is welded to the inside end of the plug 22. The grids are each pasted with 2 grams (wet weight) of the positive and negative active materials described below to produce a plate 1.0 mms thick by injection of paste into the cell half and smoothing it over the electrode supports e.g. with a doctor blade. The separator 14 (1.5 mms thick consisting of four sheets 0.35 mms thick) is then placed in position and 3 mls of aqueous sulphuric acid (1.310 specific gravity) poured onto it. The cell halves are then secured together by ultrasonic welding. The caps 32 are then forced onto the two bosses 20 e.g. simultaneously. The cell is electrolytically formed at a constant current of 48 mA for 40 hours, followed by five cycles of discharge at 40 mA constant current to a cell voltage of 1.70 V followed by charge for 16 hours at 15 mA. This gave a cell having a capacity of 200 mAh at the 4 hour rate, and a cell voltage of 2.0 volts.

The positive active material composition was:
10.8 Kg grey oxide (Hardinge oxide)
4.5 g fibre
31.8 g Neosyl (fumed silica) 1540 cm$^3$ water
840 cm$^3$ Sulphuric acid (sp. gr. 1,400) and had a Density of 3.85 g/cc.

The negative active material composition was:
10.8 Kg grey oxide (Hardinge oxide)
2.2 g fibre
54 g Barium Sulphate
18 g Carbon
5.4 g antioxidant (lead stearate)
32.7 g Vanisperse CB (lignosulphonate material)
1200 cm$^3$ Water.
700 cm$^3$ Sulphuric acid (Sp. gr. 1,400) and had a Density of 4.3 gr./cc.

The separators 14 and 35 were the same and had the following physical characteristics. The separator is a sheet of glass fibres, the fibres having diameters of 0.5 to 2 microns. The sheet weighs 50 gr/sq. meter and is 0.35 mms thick or 0.27 mms thick when compressed under a load of 500 gr/sq. cm.

The sheet when suspended vertically in an atmosphere of 25° C. and 50% relative humidity with its lower edge dipping into water for 1 hour absorbed 275 ml water/sq. meter, this being measured on the wet area of material.

The material has a dry burst strength of 2.0 psi (13.8 Kilonewtons/sq. meter) and a wet burst strength (when saturated with water) of 0.18 psi (1.24 Kilonewtons/sq. meter).

The tensile strength of a 1.5 cm wide strip measured on an Instron Tensile testing machine was 430 g (dry) and 390 g. when wet. The material has an apparent density of 0.138 to 0.140 g/cm$^3$. The true density of the glass is 2.72 g/cm$^3$. The sheet has a porosity of 95% as measured by mercury intrusion porosimetry.

The cells can be secured together to build up battery packs. The positive half of the housing can be pigmented one colour e.g. red and the negative half another colour e.g. blue to assist in correct orientation of the cells. Also the terminal face 16 of the cells can be provided with cooperating holes 45 and pegs 46 to assist fitting so that the terminals 32 are in contact. The pegs and holes may be made assymetrical or located assymetrically, so that a negative face can only mate with a positive face so as to assist in correct orientation of the cells. The cells may be clipped together by spring clips located in slots 50 formed in each cover of the cell two opposed clips being used for each pair of cells and the clips being staggered from pair to pair of cells.

What we claim as our invention and desire to secure by Letters Patent is:

1. a sealed lead acid button cell, said cell having a moulded acid resistant polymer case formed in two portions, each said portion having an external surface, containing an electrode and having a central boss defining a passage leading into said cell, a metal plug having an inner end and an outer end being located in said passage, said inner end of said plug being electrically connected to said electrode, and a metal cap surrounding said central boss and being electrically connected to said plug at said outer end.

2. A cell as claimed in claim 1 wherein said cap is a force fit on said boss.

3. A cell as claimed in claim 1 in which said electrode is welded to said inner end of said plug.

4. A cell as claimed in claim 1 wherein said plug is of the same metal as said electrode.

5. A cell as claimed in claim 1 wherein said cap makes physical contact with said outer end of said plug, said outer end extending over the end of said boss.

6. A cell as claimed in claim 1 wherein each said external surface defines a recess, said cap being just proud of said surface.

7. A cell as claimed in claim 1 including a venting arrangement, said venting arrangement comprising a boss recessed below the surface of one of said case portions, said boss defining a hole communicating with the interior of said cell, said case portion defining a slot, said slot containing said boss and cooperating with a spring biased against said hole in said boss, said spring carrying a sealing pad adapted to unseal said hole when the pressure rises in said cell.

8. A cell as claimed in claim 7 wherein said spring is recessed into said external surface of said case portion.

9. A cell as claimed in claim 1 in which said external surfaces define recesses adapted to engage clips to enable two or more cells to be clipped together to form a continuous cell pack.

10. A cell as claimed in claim 1 in which said external surfaces are provided with register means to assist in assembling packs of cells, said register means being such as to ensure that cells can only be assembled in the correct polarity relationships.

11. A cell as claimed in claim 1 in which said electrodes have expanded metal supports for the active material.

12. A cell as claimed in claim 1 in which the electrodes of opposite polarity are separated from each other by a dense sheet of acid resistant fibres.

13. A cell as claimed in claim 1 in which each said electrode is separated from the inside of a respective case portion of said cell by a ring of a dense sheet of acid resistant fibres.

14. A cell as claimed in claim 12 or claim 13 in which said dense sheet of acid resistant fibres comprises short staple glass fibres, of micron or sub-micron diameter.

15. A cell as claimed in claim 1 in which one of the said portions of the case is one colour and the other of said portions of the case is another colour to assist in correct orientation of the cells.

16. A battery made up of sealed lead acid cells as claimed in claim 1.

17. A battery as claimed in claim 16 wherein said cells are clipped together by spring clips located in slots formed in each said portion of said case of the cells, two opposed clips being used for each pair of cells and the clips being staggered from pair to pair of cells.

* * * * *